United States Patent [19]
Hay

[11] Patent Number: 5,472,073
[45] Date of Patent: Dec. 5, 1995

[54] VEHICLE DRIVE SHAFT DISCONNECT ASSEMBLY

[76] Inventor: Earl W. Hay, 2810 Fishing Creek Valley Rd., Harrisburg, Pa. 17112

[21] Appl. No.: 270,580

[22] Filed: Jul. 5, 1994

[51] Int. Cl.$^6$ .............................. F16D 1/033; F16D 11/14
[52] U.S. Cl. .................. 192/69.6; 180/383; 192/110 R; 192/114 R; 403/293; 403/336; 403/337; 464/182
[58] Field of Search ............................... 192/67 P, 114 R, 192/110 S, 110 R, 67 R; 403/337, 336, 292, 293; 180/383, 384; 464/182, 183

[56] References Cited

U.S. PATENT DOCUMENTS

| | | | |
|---|---|---|---|
| 895,152 | 8/1908 | Bornefeld | 192/67 R |
| 1,440,341 | 12/1922 | Crispen | 192/67 R |
| 1,462,016 | 7/1923 | Lewis | 192/67 R |
| 1,463,237 | 7/1923 | Young et al. | 192/67 R |
| 1,753,300 | 4/1930 | Peterson | 192/67 R |
| 2,001,292 | 5/1935 | Von Soden-Fraunhofen et al. | 192/67 R |
| 2,619,211 | 11/1952 | Belden | 192/67 R |
| 3,251,630 | 5/1966 | Astley | 192/67 R |
| 3,504,776 | 4/1970 | Misenti | 192/67 R |
| 4,118,951 | 10/1978 | Neasham | 180/383 X |
| 4,610,558 | 9/1986 | Erickson | 192/67 R |
| 4,856,633 | 8/1989 | Specht | 192/67 R |
| 4,892,430 | 1/1990 | Liska et al. | 403/337 X |
| 5,048,652 | 9/1991 | Cycon et al. | 192/67 P |

*Primary Examiner*—Rodney H. Bonck
*Attorney, Agent, or Firm*—Brady, O'Boyle & Gates

[57] ABSTRACT

A vehicle drive shaft disconnect assembly adapted to be retrofitted into the conventional tubular drive shaft of the vehicle for disconnecting the vehicle automatic transmission from its rear wheels to prevent damage to the automatic transmission while the vehicle is being towed. The tubular drive shaft is cut to provide a first shaft portion extending rearwardly of the vehicle to the rear wheels and a second shaft portion extending forwardly to the vehicle automatic transmission. A core member is inserted into the tubular shaft and extends between the first and second shaft portions. The portion of the core positioned in the second shaft portion is fixed therein while the first shaft portion is rotatably mounted on the portion of the core positioned therein. An apertured flange is fixed to the first shaft portion and a spring biased flange having pins insertable into the apertures of the fixed flange is axially slidable on the second shaft portion so that the shaft portions can be selectively connected and disconnected from each other. In one embodiment a latch assembly is employed for pulling and holding the slidable flange away from the fixed flange, and in another embodiment, a plurality of bolt and nut assemblies and a spacer are employed for disconnecting and holding the slidable flange away from the fixed flange.

16 Claims, 5 Drawing Sheets

5,472,073

VEHICLE DRIVE SHAFT DISCONNECT ASSEMBLY

BACKGROUND OF THE INVENTION

In order to prevent damage to the automatic transmission of a rear axle drive vehicle being towed for a long distance, it has been customary to either remove the vehicle drive shaft, or lift the rear end of the vehicle off the ground and tow it backwards so no portion of the automatic transmission rotates during travel.

Many vehicle drivers do not have the expertise to remove the vehicle drive shaft, and to lift the vehicle, and to employ a small trailer to support the front or back wheels adds to the expense of towing the vehicle long distances. Also, with large vehicles, such as recreation vehicles, trucks, and the like, often there is no equipment available to lift and tow the vehicle from the rear end.

After considerable research and experimentation, the drive shaft disconnect assembly of the present invention has been devised to be retrofitted on a conventional drive shaft of a vehicle, whereby a simple manipulation of the assembly disconnects the automatic transmission from the rear wheels to thereby prevent damage to the automatic transmission of the vehicle to be towed.

SUMMARY OF THE INVENTION

The drive shaft disconnect assembly of the present invention comprises, essentially, a core member inserted into the bore of a conventional vehicle drive shaft which has been cut into a first shaft portion extending rearwardly of the vehicle to the rear wheels and a second shaft portion extending forwardly to the vehicle automatic transmission. The core member extends between the first and second shaft portions. The portion of the core positioned in the bore of the second shaft portion is fixedly mounted therein, and the portion of the core positioned in the bore of the first shaft portion is rotatably mounted therein, whereby the first shaft portion is rotatable relative to the second shaft portion. A circular flange is fixedly connected to the outer wall surface of the first shaft portion and is provided with a plurality of circumferentially spaced, axially extending apertures. A similar circular flange is axially slidable on the outer wall surface of the second shaft portion, the slidable flange having axially extending pins fixedly connected thereto and slidably within the aligned apertures in the fixed flange in the first shaft portion, whereby the first and second shaft portions can be selectively connected and disconnected. The slidable flange and associated pins are spring biased into engagement with the fixed flange on the first shaft portion, whereby the first and second shaft portions are normally interconnected.

In one embodiment, a latch assembly, is employed for pulling and holding the slidable flange away from the fixed flange, to thereby disconnect the first and second shaft portions from each other. The latch assembly is provided with an actuating lever handle which is accessible from the side of the vehicle, whereby the drive shaft disconnect assembly can be actuated without requiring the operator to go underneath the vehicle.

In another embodiment, in lieu of the latch assembly, a plurality of bolt and nut assemblies are detachably connected to the fixed and slidable flanges.

DESCRIPTION OF THE PREFERRED EMBODIMENTS

Figure 1A:
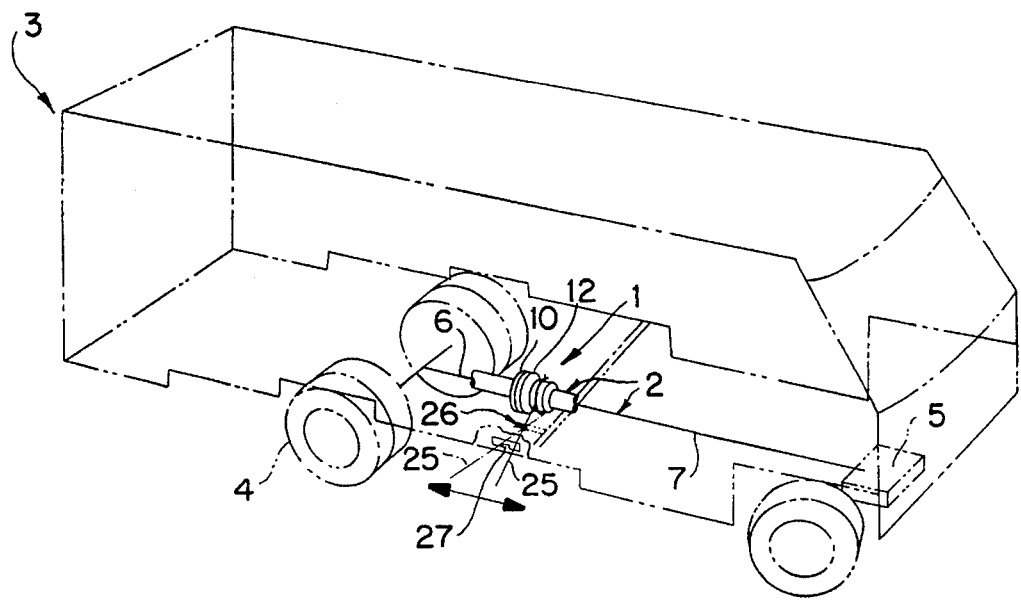
FIG. 1A is a fragmentary, perspective view showing the drive shaft disconnect assembly installed in the drive shaft of a vehicle, such as a recreational vehicle shown in phantom.
Figure 1B:
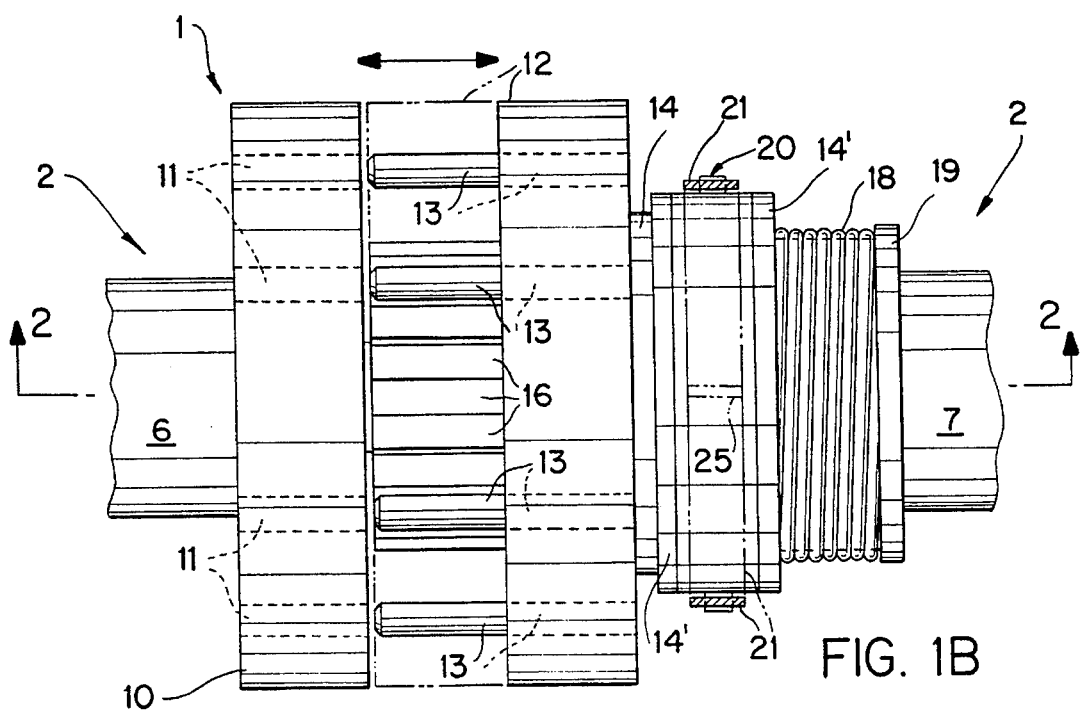
FIG. 1B is a side elevational view of the drive shaft disconnect assembly actuated to disconnect the vehicle rear wheels from the automatic transmission at the front of the vehicle.

Referring to the drawings in greater detail, and more particularly to FIGS. 1A and 1B, the drive shaft disconnect assembly 1 of the present invention is adapted to be installed in the conventional tubular drive shaft 2 of a vehicle 3, whereby the vehicle rear wheels 4 can be disconnected from the automatic transmission 5 when the vehicle is being towed, to thereby prevent damage to the automatic transmission.

Figure 2:
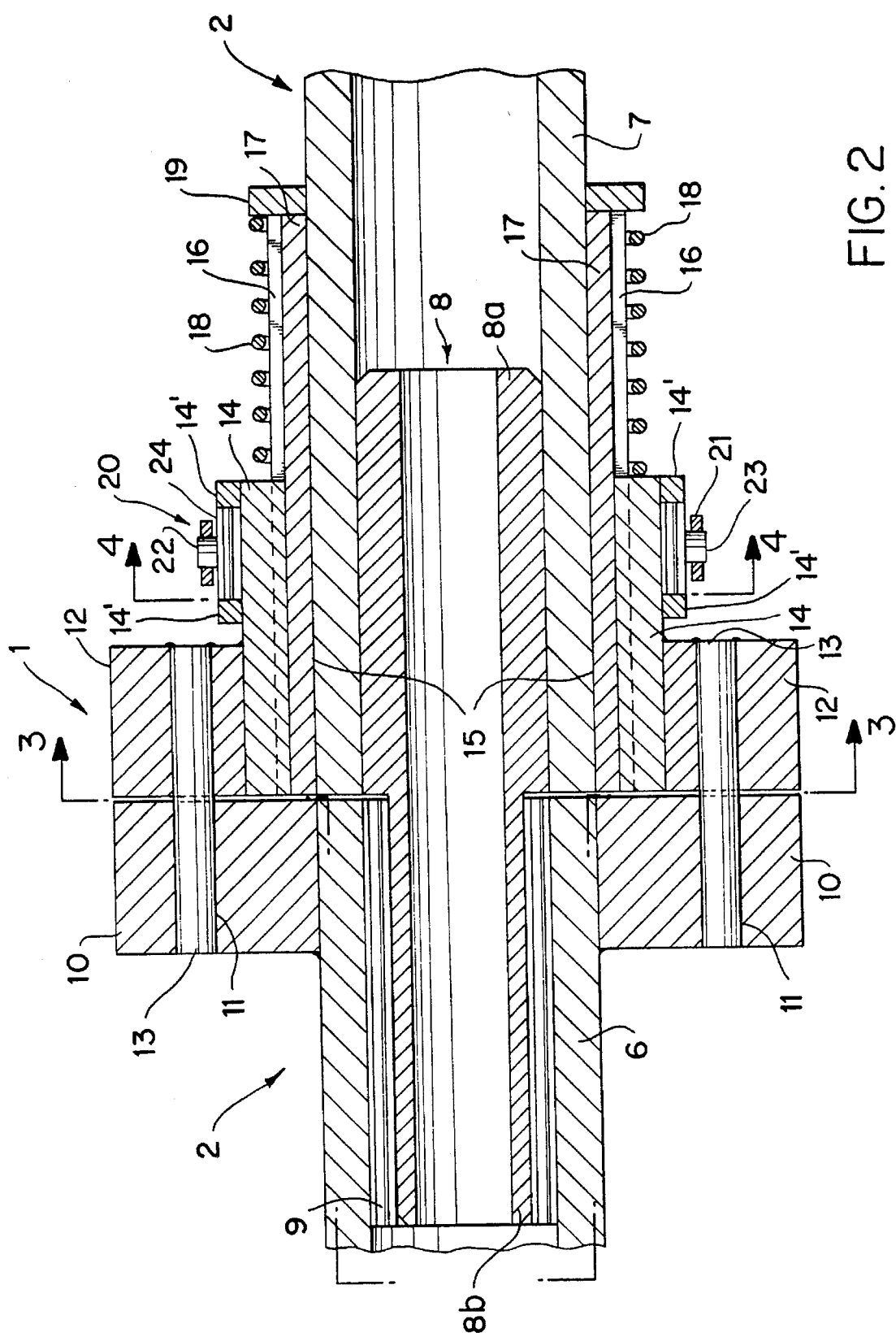
FIG. 2 is a view taken substantially along line 2—2 of FIG. 1B but showing the drive shaft assembly in the connect mode where the vehicle rear wheels are connected to the automatic transmission.

The details of the construction of the disconnect assembly 1 are shown in FIG. 2, wherein the tubular drive shaft 2 is cut to provide a first shaft portion 6 extending rearwardly of the vehicle to the differential and to the rear wheels 4, and a second shaft portion 7 extending forwardly to the vehicle's automatic transmission 5. A core member 8 is inserted into the tubular drive shaft 2 and extends between the first and second shaft portions 6 and 7, respectively. The end portion 8a of the core member which extends into the second shaft portion 7 is fixedly secured to the inner wall surface of the shaft portion 7. The opposite end portion 8b of the core member 8 which extends into the first shaft portion 6 has a smaller diameter than core portion 8a and is press fit into the inner race of a needle bearing 9 having its outer race press fit within the bore of the first shaft portion 6. By this construction and arrangement, the first shaft portion 6 is rotatable relative to the second shaft portion 7, while the shaft portions are mutually supporting. It is to be understood that the core 8 and needle bearing 9 can be reversed in the first and second shaft portions 6 and 7.

A circular flange 10 having a plurality of circumferentially spaced, axially extending apertures 11, such as six as shown, is fixedly connected to the outer wall surface of the first shaft portion 6. A corresponding circular flange 12 having a corresponding plurality of circumferentially spaced, axially extending pins 13 welded thereto, aligned with apertures 11 in flange 10, is slidably mounted on the second shaft portion 7, whereby the drive shaft disconnect assembly 1 can be moved from the connect mode, as shown in FIG. 2, wherein the pins 13 are slidably engaged in the apertures 11, to the disconnect mode as shown in FIG. 1B, wherein the pins 13 are withdrawn from engagement in the apertures 11.

Figure 3:
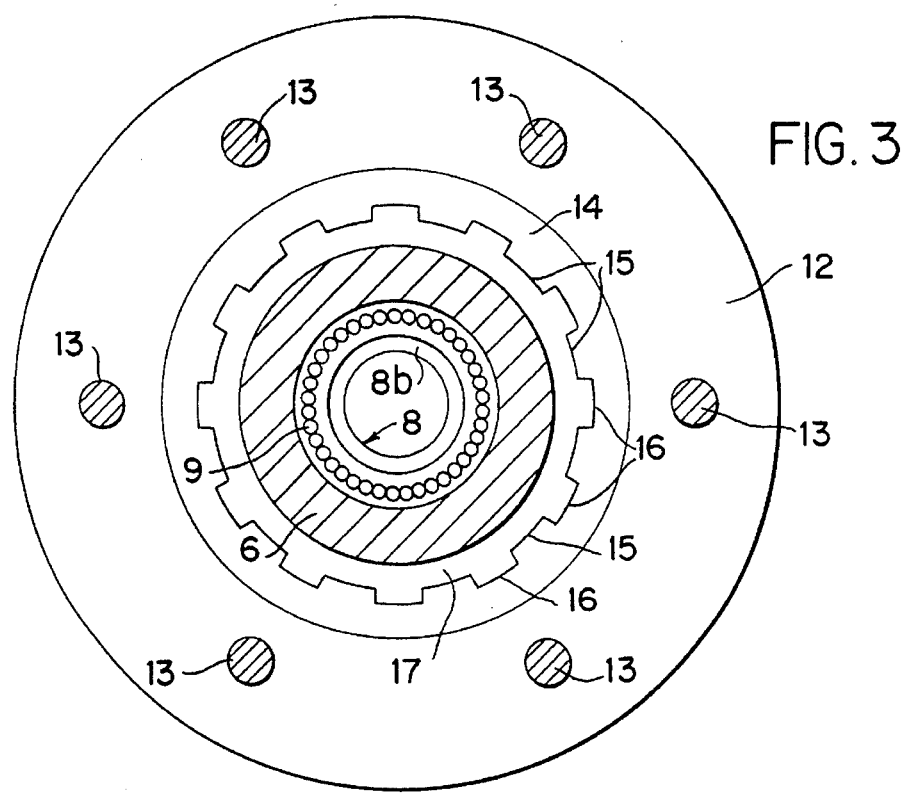
FIG. 3 is a cross-sectional view taken along line 3—3 of FIG. 2.
Figure 4:
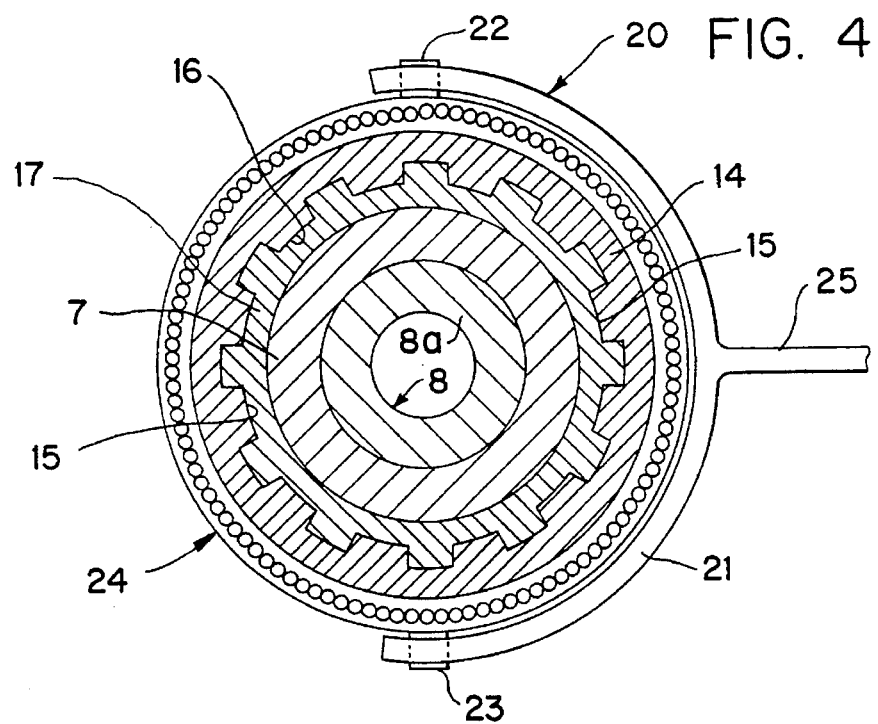
FIG. 4 is a cross-sectional view taken along line 4—4 of FIG. 2.

As will be seen in FIGS. 2, 3 and 4, the slidable connection for the flange 12 comprises a sleeve 14 upon which the flange is fixedly secured, the sleeve having a radially inwardly extending spline surface 15 cooperating with a radially outwardly extending spline surface 16 on a sleeve 17 fixedly mounted on the outer surface of the second shaft portion 7.

As will be seen in FIGS. 1B and 2, a heavy duty coil spring 18 is axially mounted around sleeve 17 between the end face of sleeve 14 and a ring 19 fixedly secured to the outer wall surface of the second shaft portion 7, whereby the slidable flange 12 and associated pins 13 are normally biased toward the flange 10 and associated apertures 11 wherein the disconnect assembly is in the connect mode, as shown in FIG. 2.

In order to axially slide the flange 12 and associated pins 13 to the disconnect mode of FIG. 1B, as shown in FIG. 2, a latch assembly 20 is provided. As will be seen in FIGS. 2 and 4, a yoke 21 is pivotally connected to diametrically disposed, oppositely extending pins 22 and 23 connected to the outer race of a roller bearing 24 which is fixedly secured to the outer surface of sleeve 14 by spaced flanges 14' connected to sleeve 14. The yoke 21 is provided with an actuating lever handle 25 pivotally connected to the vehicle frame as at 26, and extending outwardly to the side of the vehicle 3, as shown schematically in FIG. 1A, through a keeper 27 so that when the handle 25 is moved in the direction of the vehicle wheels 4, as shown in phantom lines, the assembly is held by the keeper 27 in the disconnect mode as shown in FIG. 1B, and when the handle 25 is moved in the direction of the automatic transmission 5, as shown in full lines, the assembly is held by the keeper 27 and spring 18 in the connect mode. The roller bearing 24, to which the yoke 21 is secured, facilitates the manipulation of the handle 25 while in the keeper 27.

In the disconnect mode, when the vehicle is towed by its front end, the vehicle rear wheels 4 through the rear axle and differential assembly will rotate first drive shaft portion 6, which will rotate on bearing 9 engaged by core member 8 connected in second drive shaft portion 7. However, no rotation force will be imparted to second drive shaft portion 7, so no portion of the automatic transmission 5 to which it is connected will rotate during travel.

Figure 5:
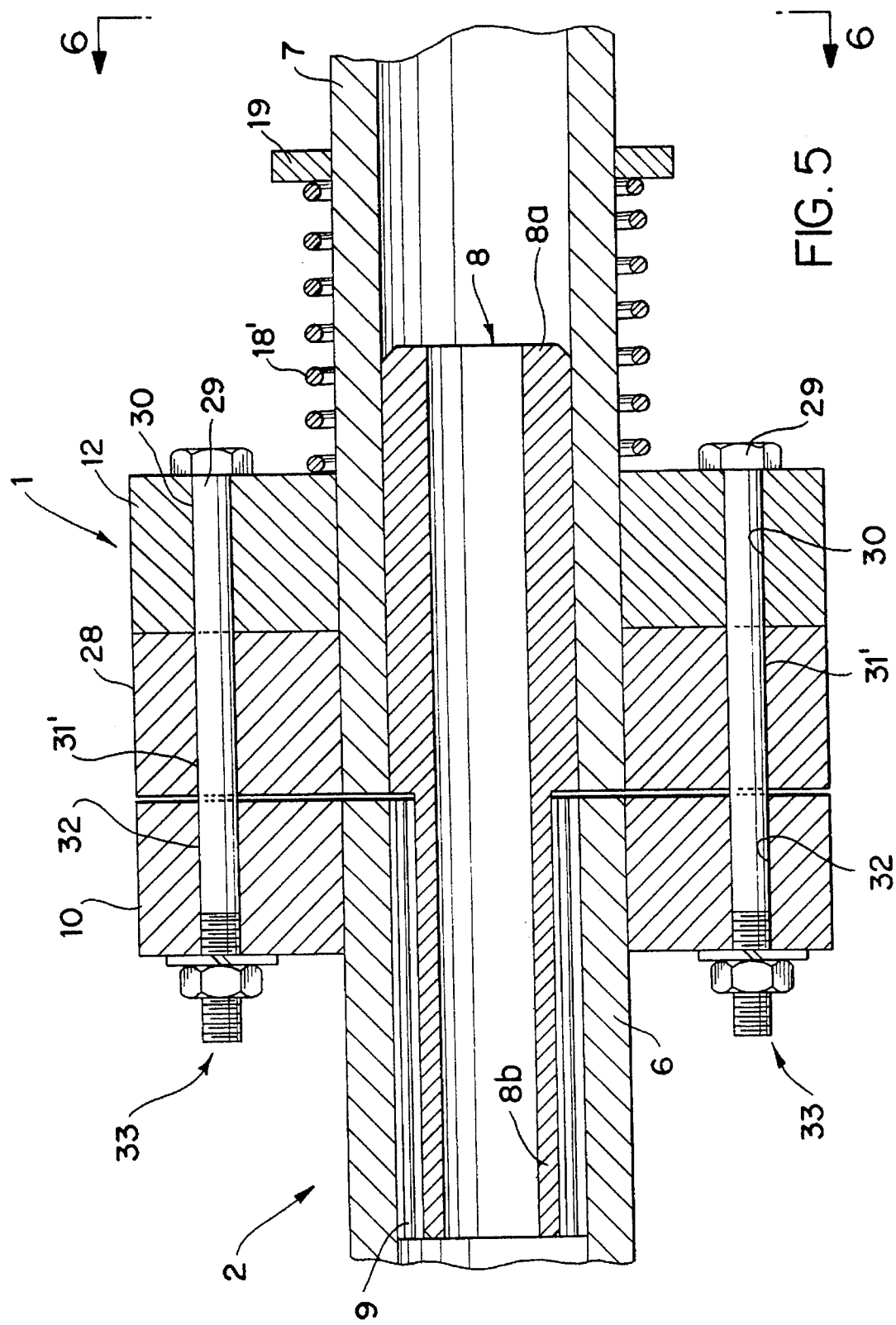
FIG. 5 is a longitudinal sectional view, showing another embodiment of the drive shaft disconnect assembly.
Figure 6:
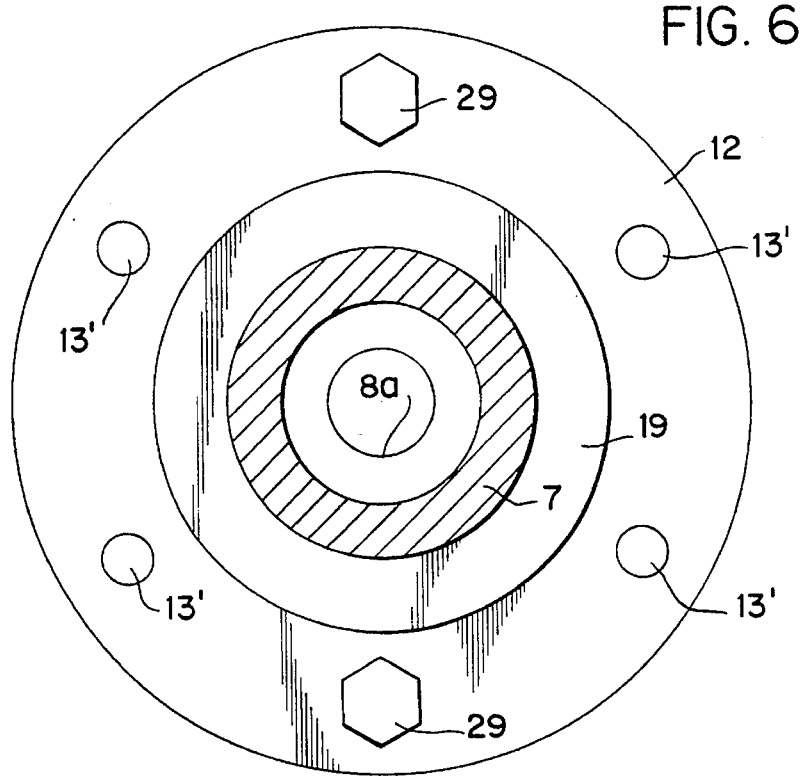
FIG. 6 is a cross-sectional view taken along line 6—6 of FIG. 5.
Figure 7:
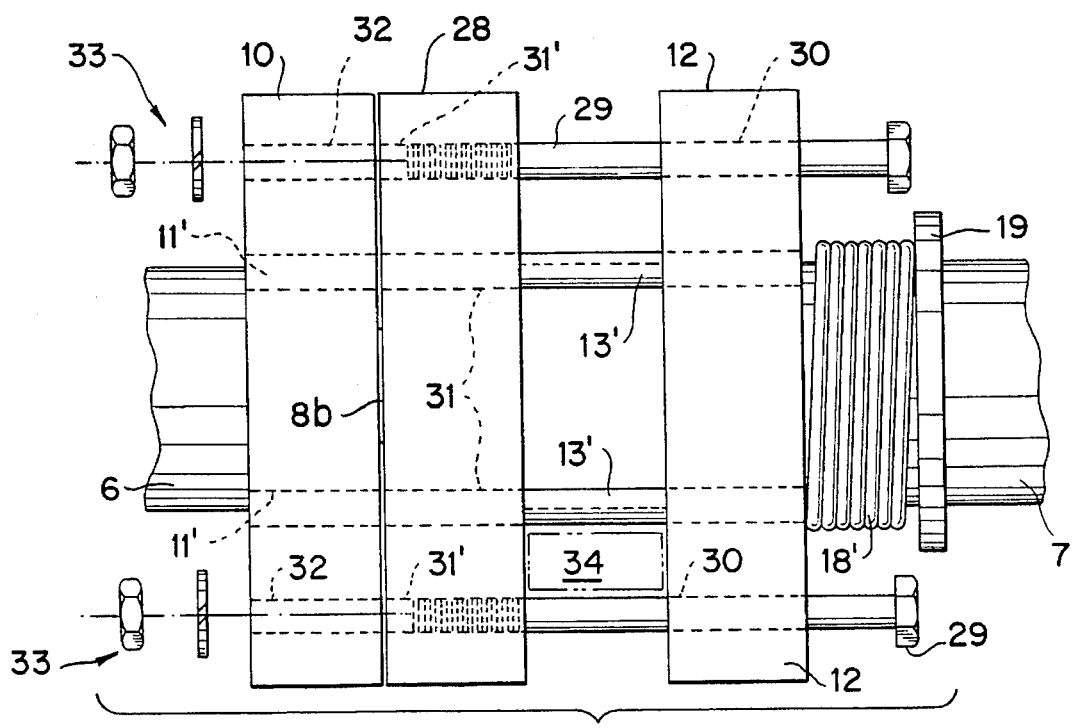
FIG. 7 is a side elevational view of the drive shaft disconnect assembly shown in FIG. 5 in the disconnect mode.

In some instances, where it is not economically feasible to provide the drive shaft disconnect assembly 1 with the latch assembly 20 to actuate and hold the assembly in a selected position, as shown in the embodiment of FIGS. 1A to 4, another arrangement can be provided, as shown in FIGS. 5 to 7, wherein a third circular flange 28 is fixedly mounted on the end of the second shaft portion 7 between the fixed flange 10 on the first shaft portion 6 and the slidable flange 12 on the second shaft portion 7. A plurality of axially extending pins 13', such as four pins, are fixedly connected to slidable flange 12, and slidably extend through aligned apertures 31' in fixed flange 28 and aligned apertures 11' in fixed flange 10. To secure the assembly in the connect mode, as shown in FIG. 5, a plurality or pair of diametrically positioned, axially extending bolts 29 are slidable through aligned apertures 30, 31', 32 and in the respective flanges 12, 28 and 10, the bolts 29 being secured in place by nut and washer assemblies 33.

To disconnect the shaft portions 6 and 7, as shown in FIG. 7, the bolt and nut assemblies 29 and 33 are disconnected so that the flange 12 and associated pins 13' can be manually pulled in a direction away from the flanges 28 and 10, against the biasing force of spring 18' axially mounted around shaft portion 7 between fixed flange 19 and moveable flange 12, so that the pins 13' are removed from the apertures 11' in flange 10, whereby the first shaft portion 6 can rotate relative to the second shaft portion 7. In order to hold the slidable flange 12 in the released position against the biasing force of the spring 18', a suitable spacer 34 is manually inserted in the space between the fixed flange 28 and slidable flange 12.

From the above description it will be readily appreciated by those skilled in the art that the drive shaft disconnect assembly of the present invention is an improvement over arrangements employed heretofore to prevent damage to the automatic transmission of a vehicle being towed long distances. The construction and arrangement of the core, the fixed apertured flange and spring biased slidable flange and associated pins results in an assembly which can be retrofitted on a conventional tubular drive shaft; thus, not requiring the assembly to be a factory installed component.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A vehicle drive shaft disconnect assembly for disconnecting a vehicle automatic transmission from the rear wheels of the vehicle when the vehicle is being towed, comprising, a core member, a vehicle drive shaft being tubular and cut to provide a first rear wheel shaft portion for extending rearwardly of a vehicle and a second automatic transmission shaft portion for extending forwardly of a vehicle, said core member being inserted in said tubular shaft and extending between the first and second shaft portions, one of said first shaft and second shaft portions being rotatably mounted on the portion of the core positioned therein, the portion of the core positioned in the other of said first and second shaft portion being fixedly mounted therein, whereby the first shaft portion is rotatable relative to the second shaft portion, a first flange fixedly connected to the outer wall surface of the first shaft portion, at least one axially extending aperture provided in said first flange, a second flange axially slidable on the outer wall surface of the second shaft portion, at least one axially extending pin connected to said second flange and slidable within the aligned aperture in said first flange, whereby the first and second shaft portions can be selectively connected and disconnected, and spring means biasing the second flange and associated pin into engagement with the first flange on the first shaft portion, whereby the first and second shaft portions are normally interconnected, the second flange being slidable against the biasing force of said spring means to disconnect the first and second shaft portions.

2. A vehicle drive shaft disconnect assembly according to claim 1, wherein the first and second flanges are circular, said at least one axially extending aperture comprising a plurality of circumferentially spaced, axially extending apertures provided in said first flange, and said at least one axially extending pin comprising a plurality of circumferentially spaced, axially extending pins on the second flange insertable into the aligned apertures in the first flange.

3. A vehicle drive shaft disconnect assembly according to claim 1, wherein the spring means comprises a heavy duty coil spring surrounding the second shaft portion, an abutment fixed to the outer surface of said second shaft portion and axially spaced from the second flange, said coil spring being operatively connected to the second flange and abutment.

4. A vehicle drive shaft disconnect assembly according to claim 1, wherein the second flange is fixedly connected to a first axially extending sleeve having a radially inwardly extending spline surface , a second axially extending sleeve mounted on the outer surface of said second shaft portion, said second sleeve having a radially outwardly extending spline surface cooperating with the radially inwardly extending spline surface on the first sleeve, whereby the second flange is slidably mounted on the second shaft portion.

5. A vehicle drive shaft disconnect assembly according to claim 4, wherein a yoke is cooperatively connected to said first sleeve, an actuating handle connected to said yoke, said handle adapted to extend outwardly to a side of a vehicle, a keeper adapted to be mounted on a side of a vehicle, said handle extending through said keeper, said handle adapted to be pivotally connected to a vehicle frame at a position between the yoke and the keeper, whereby when the handle is moved in a direction toward the first shaft portion the second flange is latched in a disconnected position relative to the first flange, and when the handle is moved in the opposite direction the second flange is latched in the inter-connected position with the first flange.

6. A vehicle drive shaft disconnect assembly according to claim 5, wherein a bearing is interposed the yoke and said first sleeve, whereby said first sleeve is rotatable on the longitudinal axis of the second shaft portion relative to said yoke, to thereby facilitate the manipulation of the handle in the keeper.

7. A vehicle drive shaft disconnect assembly according to claim 1, wherein latch means are operatively connected to the second flange for holding the second flange in a disconnected position away from the first flange against the biasing force of said spring means.

8. A vehicle drive shaft disconnect assembly according to claim 7, wherein the latch means comprises a yoke operatively connected to the second flange, an actuating lever handle connected to said yoke, said handle adapted to extend outwardly to the side of a vehicle, a keeper adapted to be mounted on a side of a vehicle, said handle extending through said keeper, said handle adapted to be pivotally connected to a vehicle frame at a position between the yoke and the keeper, whereby when the handle is moved in a direction toward the first shaft portion the first and second flanges are disconnected, and when the handle is moved in the opposite direction the first and second flanges are inter-connected.

9. A vehicle drive shaft disconnect assembly according to claim 8, wherein a bearing is operatively connected to the second flange and yoke, whereby the yoke is rotatable relative to the longitudinal axis of the second shaft portion to thereby facilitate the manipulation of the handle in the keeper.

10. A vehicle drive shaft disconnect assembly according to claim 1, wherein a third flange is fixedly mounted on the end portion of the second shaft portion intermediate the first flange on the first shaft portion and the second flange slidably mounted on the second shaft portion, the pin on said second flange being slidable through said third flange into said first flange, and nut and bolt assemblies extending through said first, second and third flanges for holding the flanges in the interconnected position.

11. A vehicle drive shaft disconnect assembly according to claim 10, wherein the bolt and nut assemblies are removable, whereby the second flange is slidable in a direction away from the third flange against the biasing force of said spring means, and a spacer insertable in the space between the second and third flanges for holding the second flange in the disconnected mode.

12. A vehicle drive shaft disconnect assembly according to claim 1, wherein a bearing is mounted in the bore of one of said first and second tubular shaft portions rotatably mounted on the portion of said core positioned therein, and the portion of the core positioned in said first and second shaft portions rotatably mounted on said core being mounted in said bearing.

13. A vehicle drive shaft disconnect assembly according to claim 1, in which said first shaft portion is rotatably mounted on the portion of said core positioned therein, and said second shaft portion is fixedly connected to the portion of said core positioned therein.

14. A vehicle drive shaft disconnect assembly according to claim 13, including a bearing mounted in the bore of said first tubular shaft portion, and the portion of said core positioned in said first shaft portion being mounted in said bearing.

15. A vehicle drive shaft disconnect assembly according to claim 14, in which said portion of said core mounted in said bearing having a diameter less than the portion of said core fixedly connected in said second tubular shaft portion.

16. A vehicle drive shaft disconnect assembly according to claim 1, in which said spring means is coaxially connected on said second shaft portion.

* * * * *